US008605296B2

(12) United States Patent
Fry et al.

(10) Patent No.: US 8,605,296 B2
(45) Date of Patent: Dec. 10, 2013

(54) DIGITAL SIGNATURE SYSTEM AND METHOD

(75) Inventors: Eugene L. Fry, Austin, TX (US); Aleksander Roman Szymanski, Ipswich (GB); Dennis J. Nasto, San Diego, CA (US); David D. Vineyard, Bastrop, TX (US)

(73) Assignee: SecureCare Technologies, Inc., Austin, TX (US)

( * ) Notice: Subject to any disclaimer, the term of this patent is extended or adjusted under 35 U.S.C. 154(b) by 710 days.

(21) Appl. No.: 12/790,376

(22) Filed: May 28, 2010
(Under 37 CFR 1.47)

(65) Prior Publication Data
US 2011/0116140 A1    May 19, 2011

Related U.S. Application Data

(60) Provisional application No. 61/182,035, filed on May 28, 2009.

(51) Int. Cl.
*G06F 3/12* (2006.01)
(52) U.S. Cl.
USPC ............ 358/1.1; 713/150; 713/155; 713/156; 713/161; 713/168; 713/169; 713/176; 713/182; 713/189; 713/191; 705/76; 705/67; 705/65; 705/64

(58) Field of Classification Search
None
See application file for complete search history.

(56) References Cited

U.S. PATENT DOCUMENTS

| | | | |
|---|---|---|---|
| 5,659,616 A * | 8/1997 | Sudia | 705/76 |
| 7,194,618 B1 * | 3/2007 | Suominen | 713/155 |
| 7,237,114 B1 * | 6/2007 | Rosenberg | 713/176 |
| 2001/0011350 A1 * | 8/2001 | Zabetian | 713/176 |

* cited by examiner

*Primary Examiner* — Paul F Payer
(74) *Attorney, Agent, or Firm* — Bernard L. Kleinke; Duckor Spradling Metzger & Wynne

(57) ABSTRACT

A digital signature system and method are disclosed. The digital signature system may include a remote certificate server for storing and maintaining at least one digital certificate of a user by a service provider and a digital signature printer driver loaded on the user's computer for communicating with the service provider via a network, such as the Internet. The digital signature printer driver may obtain verification of the user's identity from the service provider via the network and electronically place on a printable document a digital signature of the user based on the remotely stored digital certificate. The system may further include a remote storage server for storing a digital copy of the digitally signed document. The digital signature may include a unique identifier for subsequent validation of the digital signature by the service provider.

6 Claims, 4 Drawing Sheets

DIGITAL SIGNATURE SYSTEM AND METHOD

RELATED APPLICATION

The application claims priority to U.S. provisional patent application No. 61/182,035, entitled PRINTER DRIVER DIGITAL SIGNATURE SYSTEM AND METHOD, filed May 28, 2009, which is incorporated herein by reference.

FIELD OF THE INVENTION

The present invention relates in general to a digital signature system and method. It more particularly relates to such a system with digital signature capabilities that enables a user to quickly and easily digitally sign a document in a secure manner.

BACKGROUND ART

There is no admission that the background art disclosed in this section legally constitutes prior art.

With the increase in use of paperless systems, the use of digital signatures is also on the rise. Typically, the use of a digital signature requires the user to store a digital certificate locally on his or her computer hard drive or other location and perform a number of operations to insert their digital signature on a document having the required format. The locally stored digital certificate may be subject to theft or destruction, and must be routinely updated and/or verified for at least some applications. Alternately, the digital certificate may have been accessible via a website, however the number of operations to insert the digital signature in either situation may be quite burdensome to the user.

BRIEF DESCRIPTION OF THE DRAWINGS

The features of this invention and the manner of attaining them will become apparent, and the invention itself will be best understood by reference to the following description of certain embodiments of the invention taken in conjunction with the accompanying drawings, wherein.

DETAILED DESCRIPTION OF CERTAIN EMBODIMENTS OF THE INVENTION

Figure 1:
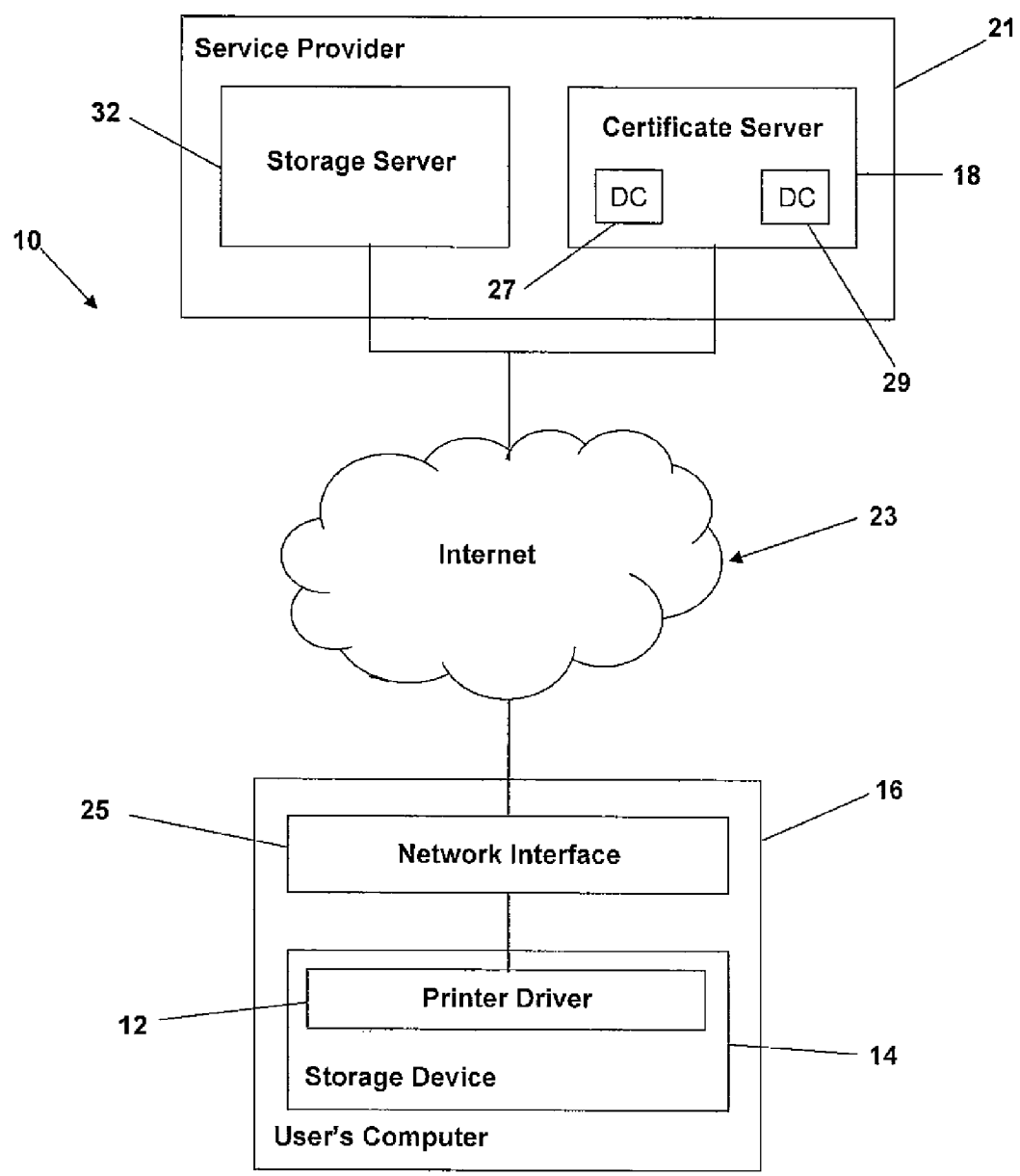
FIG. 1 is a block diagram of a digital signature system according to an embodiment of the present invention having a digital signature printer driver loaded on a user's computer and a digital certificate remotely stored by a service provider.

It will be readily understood that the components of the embodiments as generally described and illustrated in the drawings herein, could be arranged and designed in a wide variety of different configurations. Thus, the following more detailed description of certain ones of the embodiments of the system, components and method of the present invention, as represented in the drawings, is not intended to limit the scope of the invention, as claimed, but is merely representative of the embodiments of the invention.

There is disclosed a digital signature system and method. One embodiment of the digital signature system may include a remote certificate server for storing and maintaining at least one digital certificate of a user by a service provider and a digital signature printer driver loaded on the user's computer for communicating with the service provider via a network, such as the Internet. The digital signature printer driver may obtain verification of the user's identity from the service provider via the network and electronically place on a printable document a digital signature of the user based on the remotely stored digital certificate. The system may further include a remote storage server for storing a digital copy of the digitally signed document. The digital signature may include a unique identifier provided by the service provider.

In accordance with another embodiment of the present invention, there is provided a method of providing a digital signature for a user. The method may include remotely storing and maintaining a digital certificate for the user in a certificate server, providing the user with a digital signature printer driver adapted to be stored in the user's computer, verifying the identity of the user using the certificate server communicating with the digital signature printer driver via a network, authorizing electronic placement on a printable document of the user's digital signature based on the remotely stored digital certificate using the certificate server communicating with the digital signature printer driver via the network, and remotely storing a digital copy of the digitally signed document in a storage server. The digital signature may also include a unique identifier that may be used at a subsequent date to verify the validity of the signature. A user may simply enter the identifier on an online website to establish who signed the document and at what date and time.

In accordance with still another embodiment of the present invention, there is provided a digital signature system having a remote certificate server for storing and maintaining at least one digital certificate of a user by a service provider and a printer driver stored in the user's computer for communicating with the service provider via a network, such as the Internet. The printer driver may obtain verification of the user from the certificate server via the network and electronically place on a printable document a digital signature of the user based on the remotely stored digital certificate. Furthermore, the digital signature may include an identifier to permit subsequent validation of the digital signature.

The advantage of the inventive printer driver digital signature system and method may be the ease for many applications of adding a digital signature to a printable document for the user for certain applications. Also, the digital signature according to an embodiment of the invention may be added to substantially any printable document. Furthermore, the digital certificate for authenticating the digital signature may be stored and maintained by a service provider, and a copy of the digitally signed document along with its transmission information may be remotely stored by the service provider to provide an audit trail of the signed document to the user. Additionally, by assigning and storing a unique identifier for each digital signature, the service provider may validate the digital signature upon presentation of the unique identifier.

Referring now to FIG. 1 of the drawings, there is shown a digital signature system in accordance with an embodiment of the present invention and generally referenced as 10. The system 10 may include a digital signature printer driver 12 loaded or stored in a storage device 14 on a computer 16, which is enabled to communicate with a suitable network, such as the Internet. The digital signature printer driver 12 may be in communication with a certificate server 18 of a service provider 21 via a network, such as the Internet 23, using a network interface 25 located within the computer 16. The certificate server 18 may act as a digital vault for containing or storing securely a number of digital certificates, such as digital certificates 27 and 29, for the service provider's subscribers. The service provider 21 may also include a storage server 32 for digitally storing documents, faxes, emails, or other digital items. The service provider 21 may be a suitable server communicating with a network, such as the Internet, and may store and maintain the digital certificates for the subscribers and act as a verification service for the digital certificates. The service provider 21 may further assign and store a unique identifier for each digital signature using the certificate server 18 and act as a validation service for the digital signatures via an Internet website.

Figure 2:
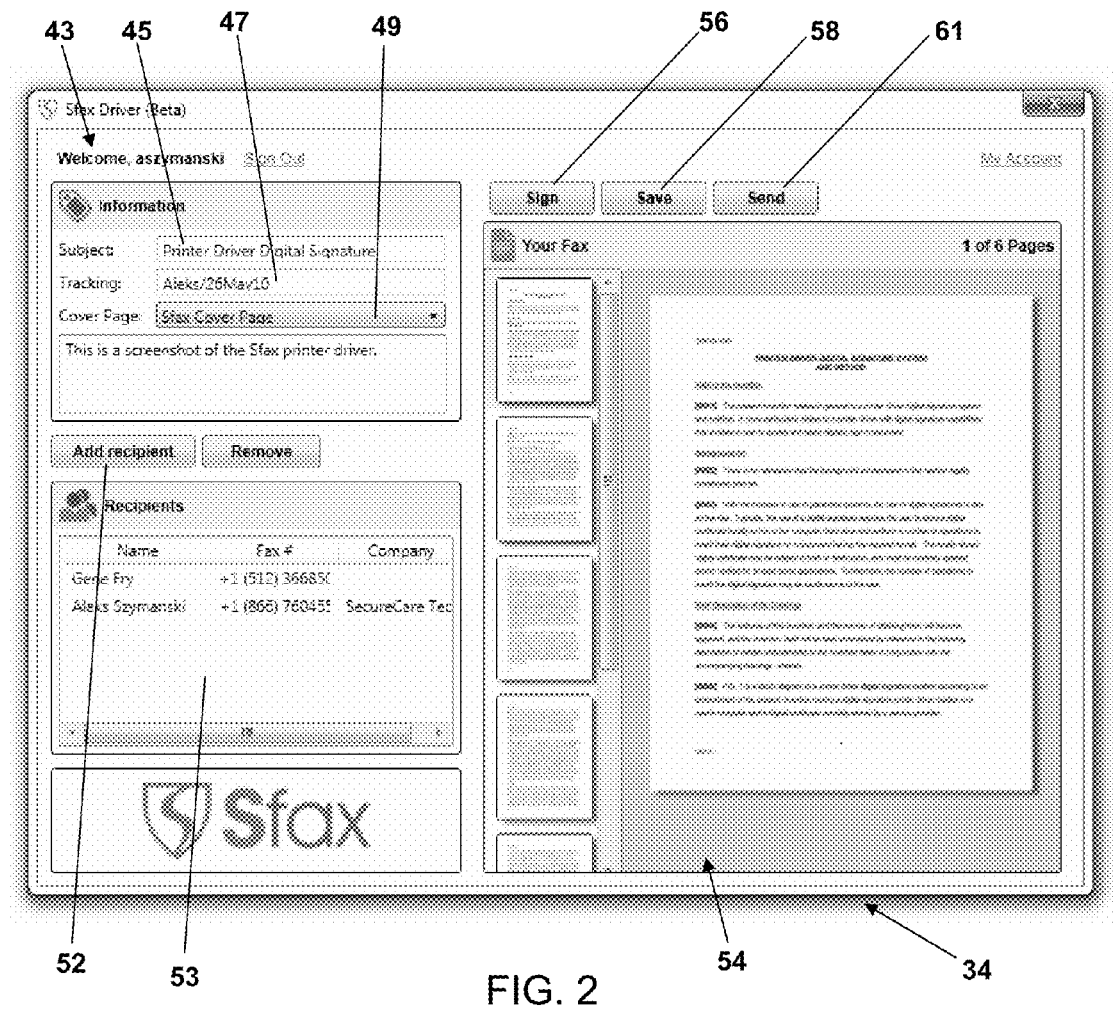
FIG. 2 is a screen print of a printer driver window of the digital signature printer driver of FIG. 1.

Referring now to FIG. 2, there is shown a printer driver window for the digital signature printer driver according to an embodiment of the present invention and generally referenced as 34. The printer driver window 34 may be displayed when the user has selected the digital signature printer driver in the print screen 63 (FIG. 4) for a document requiring the user's signature. The printer driver window 34 may allow the user to digitally sign a copy of the document in a facsimile (fax) compatible format, such as tagged image file format (TIFF), based on the user's digital certificate remotely stored by the service provider. From the printer driver window 34 the digitally signed document may be faxed or emailed to one or more recipients.

The printer driver window 34 may include a message 43 that the user is connected to the service provider, text boxes, such as test boxes 45 and 47, for inputting information regarding the message, such as the subject, a tracking reference, notes, or other information, pull-down boxes, such as pull-down box 49, for including a cover sheet and/or delivery type, text boxes or buttons, such as button 52, for inputting information regarding the recipients, such as name, company, fax number, and/or email address that may be shown in box 53, access to an address book, a view 54 of the document, and various buttons, such as buttons 56, 58, and 61, to perform the operations allowed by the digital signature printer driver, such as digitally signing or saving a document or sending the document in a fax, for example.

Figure 3:
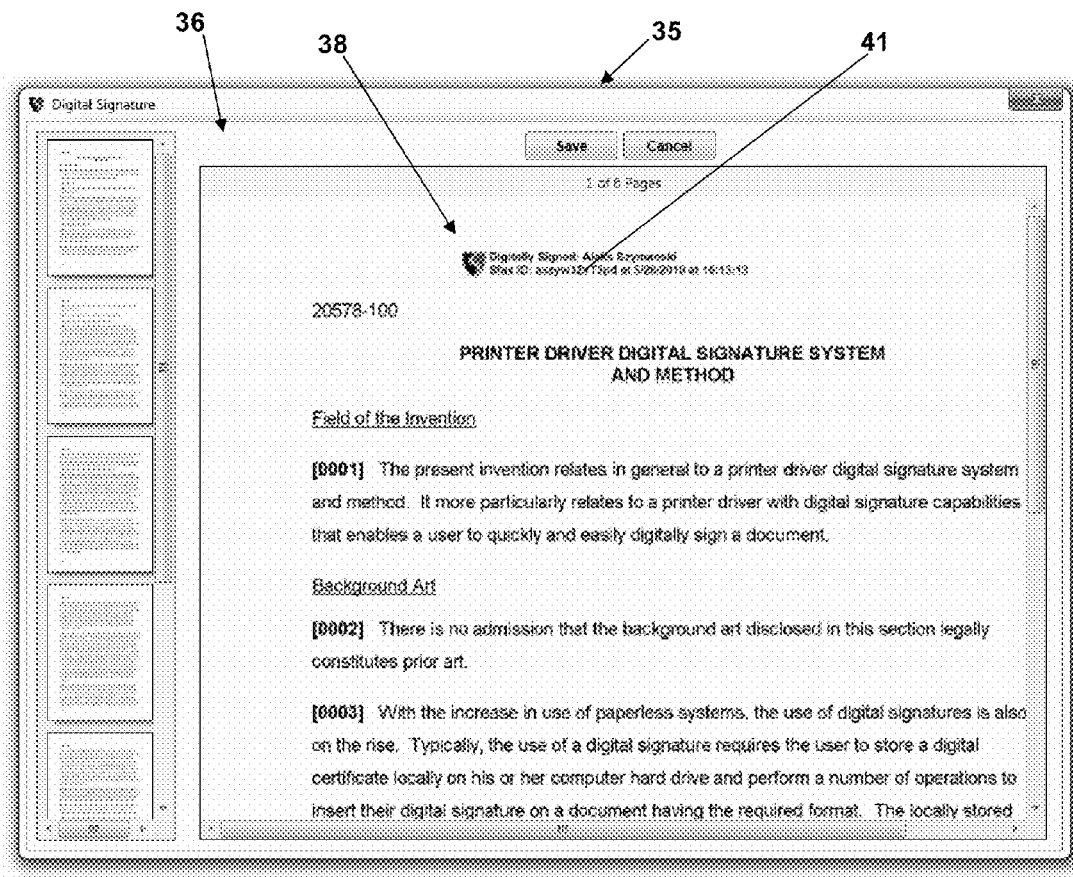
FIG. 3 is a screen print of a viewing window of the digital signature printer driver of FIG. 1 showing a document with a digital signature.

Referring now to FIG. 3, there is shown a viewing window for the digital signature printer driver according to an embodiment of the present invention and generally referenced as 35. The viewing window 35 shows an example of the digitally signed document in document 36 with a digital signature 38. The pages of the document may be shown in a column on the left side of the viewing window 35 with the selected page shown to the right. The digital signature 38 added to the document 36 may include a unique identifier 41, such as the identifier "aszyw3ZvT3pd" shown in this example. The unique identifier 41 may be an alphanumeric identifier or other appropriate identifier. The unique identifier 41 along with information regarding the signing of the document, such as the name of the signer and the date and time of the signing, may be stored in the certificate server to allow validation of the digital signature at a subsequent time via a website provided by the service provider.

Figure 4:
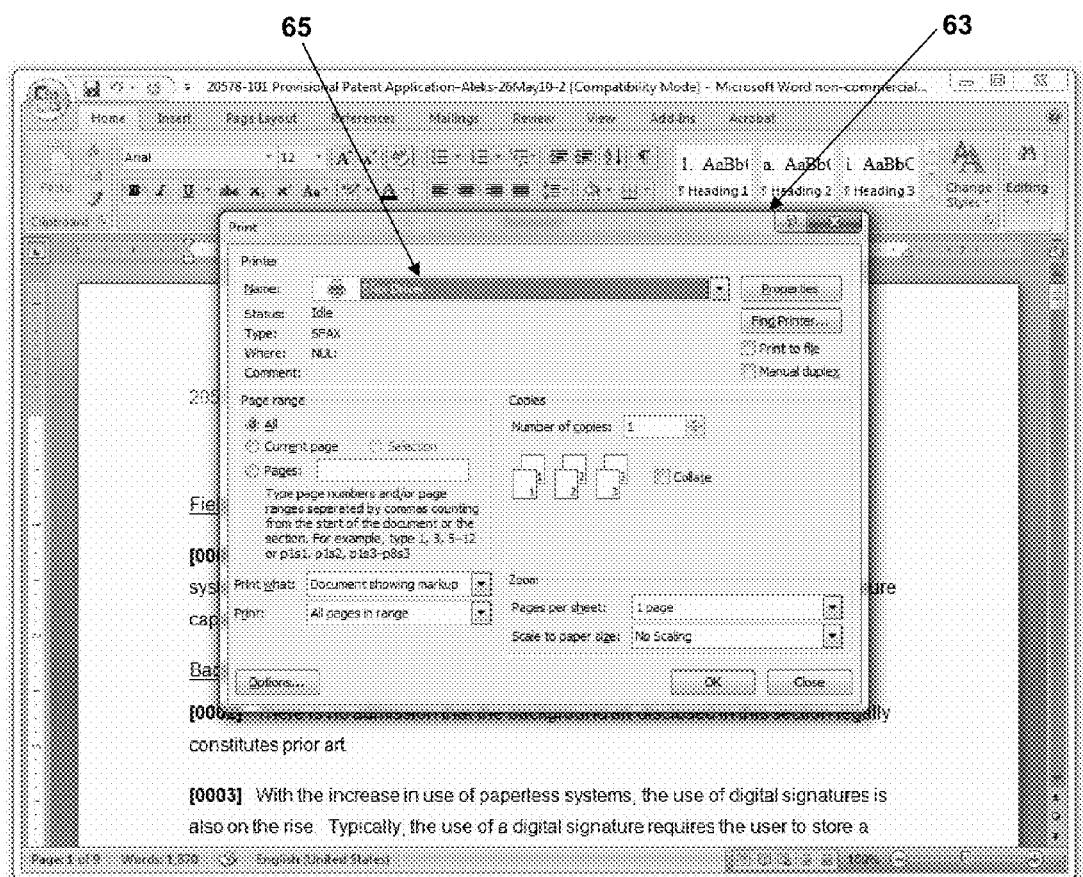
FIG. 4 is a screen print of a print screen showing the selection of the digital signature printer driver.

In operation, a user may open an account with a service provider 21 to issue and store a digital certificate, such as digital certificate 27, for the user. This initial operation may include loading a digital signature printer driver 12 on the user's computer 16. The user may then create or receive a printable document on the user's computer requiring the user's signature. The user may then open the printable document in an application appropriate for the printable document. With the printable document opened, the user may select to print the document which may open up a print screen 63 (FIG. 4). On the print screen 63 the user may select the digital signature printer driver at pull-down box 65, instead of selecting the driver of a printer in which to print the document.

Upon selection of the digital signature printer driver, the digital signature printer driver may open a connection via a network, such as the Internet, with the service provider 21 holding the user's digital certificate. At this time the service provider 21 may require verification of the user's identity, which may be accomplished automatically using previously entered verification information, such as a user name and password entered by the user when logging in to the user's computer, or by opening a verification screen (not shown) for the user to enter a user name and password.

Once the identity of the user is verified, the printer driver window 34 for the digital signature printer driver may be opened on the user's computer 16. From the digital signature printer driver window 34 the user may select an option to digitally sign the document, which may open the document in a fax compatible format, such as TIFF, to allow the user to digitally sign the document. The user may select the location on the document to place the digital signature and then select to apply the user's digital signature at that location based on the user's digital certificate remotely stored by the service provider. The location on the document, date, and time of the application of the digital signature may be stored with the digitally signed document in the fax compatible format.

Each digital signature 38 may be assigned and include a unique identifier 41, such as an alphanumeric identifier, associated with information regarding the digital signing of the document, such as the name of the signer and the date and time of the signing. The unique identifier and its associated information may be stored by the service provider to enable subsequent validation of the digital signature.

Once the document is digitally signed, the document may not be unsigned and the digital signature may not be removed from the document. A copy of the digitally signed document may be stored on the user's computer 16 and/or on the service provider's storage server 32 to create an audit trail, and/or be available to be faxed or emailed to one or more recipients for further disposition or additional signatures.

The fax and email recipients of the signed document may be capable of digitally signing the document with a digital signature printer driver loaded on their computer or may be directed to a web portal where they are required to sign in to verify their identity before being allowed to digitally sign the document and transmit the document, if necessary.

The validity of the digital signature may be subsequently verified online at a website supported by the service provider by using the unique identifier that was included with the digital signature on the electronic document. An individual wishing to validate the digital signature on the document may enter the unique identifier on the service provider's website and receive back the information stored with that unique identifier, such as the name of the signer and the date and time of the signing.

It is contemplated that further features may be included with the digital signature printer driver, such as, but not limited to, the capability to include annotations to the document in much the same way as the digital signature is included with the document.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A digital signature system, comprising:
   a service provider;
   a remote certificate server of the service provider for storing and maintaining at least one digital certificate of a user by the service provider;
   a printer driver stored in the user's computer for communicating with the service provider via a network;
   the printer driver obtaining verification of the user from the service provider via the network;
   the printer driver electronically placing on a human readable printable document a human readable digital signature of the user based on the remotely stored digital certificate and in a location on the human readable printable document selected by the user;
   wherein the remote certificate server assigns and stores a human readable identifier unique to the signature and human readable information related to signing of the human readable digital signature to permit subsequent validation of the human readable digital signature by utilizing the unique identifier;
   a remote storage server for storing a digital copy of the digitally signed human readable printable document including the human readable digital signature, the human readable identifier and human readable information related to the digital signing of the human readable printable document; and
   wherein a recipient of the digitally signed human readable printable document can validate the human readable digital signature, the human readable identifier and the human readable information related to the signing of the human readable digital signature by (1) viewing the human readable digital signature, the human readable identifier and the human readable information related to the signing of the human readable digital signature on the human readable printable document, or (2) providing the human readable identifier to the service provider via the network for comparison with the stored human readable identifier related to the signing of the human readable digital signature located on the digitally signed human readable printable document.

2. The system of claim 1, wherein the identifier is an alphanumeric identifier.

3. The system of claim 1, wherein the digitally signed human readable printable document is in a facsimile compatible format.

4. The system of claim 1, wherein the digitally signed human readable printable document is in TIFF format.

5. A method of providing a digital signature for a user, comprising:
   remotely storing and maintaining a digital certificate for the user in a certificate server of a service provider;
   providing the user with a digital signature printer driver adapted to be stored in the user's computer;
   verifying the identity of the user using the certificate server communicating with the digital signature printer driver via a network;
   authorizing electronic placement of the user's human readable digital signature on a human readable printable document in a location selected by the user and based on the remotely stored digital certificate using the certificate server communicating with the digital signature printer driver via the network;
   assigning a human readable identifier unique to the document by the certificate server for each authorization of electronic placement of the user's human readable digital signature to permit subsequent validation of the human readable digital signature;
   storing on the certificate server the human readable digital signature including the human readable identifier and human readable information related to the digital signature;
   adapting the certificate server to subsequently validate the human readable digital signature using the human readable identifier;
   remotely storing in a storage server a digital copy of the digitally signed human readable printable document including the human readable digital signature, the human readable identifier and human readable information related to the digital signing of the human readable printable document; and,
   permitting the validation of the human readable digital signature, the human readable identifier and the human readable information related to the signing of the human readable digital signature by (1) viewing the human readable digital signature, the human readable identifier and the human readable information related to the signing of the human readable digital signature on the human readable printable document, or (2) providing the human readable identifier to the service provider via the network for comparison with the stored human readable identifier related to the signing of the human readable digital signature located on the digitally signed human readable printable document.

6. The method of claim 5, wherein the human readable information relating to the human readable digital signature includes the name of the signer and the date and time of the signing.

* * * * *